Jan. 21, 1936.  W. M. WHITE  2,028,368
HYDRAULIC TURBINE
Filed March 31, 1934  2 Sheets-Sheet 1

Inventor
W. M. White
by [signature]
Attorney

Jan. 21, 1936.  W. M. WHITE  2,028,368
HYDRAULIC TURBINE
Filed March 31, 1934   2 Sheets-Sheet 2

Inventor
W. M. White
by
Attorney

Patented Jan. 21, 1936

2,028,368

UNITED STATES PATENT OFFICE 2,028,368

HYDRAULIC TURBINE

William M. White, Milwaukee, Wis.

Application March 31, 1934, Serial No. 718,360

5 Claims. (Cl. 253—148)

This invention relates to improvement in the conversion of hydraulic energy into mechanical energy and more particularly to the conversion of hydraulic energy by hydraulic turbines of the axial flow type.

In hydraulic turbines of the axial flow type, the volume of water entering the turbine is generally controlled by a gate composed of a plurality of vertically mounted vanes rotatably movable into abutting or overlapping relation. Such vanes also give direction to the flow of water causing the water to flow in a tangential direction relative to the circle including the guide vanes of the turbine. The point of tangency to the circle is dependent on the angle, relative to the stream lines of the entering water, to which the guide vanes are rotated. Such tangential guidance of the water changes the flow from a flow radial to the axis of the turbine into a circumferential or whirling flow about the axis which then acts on the turbine vanes to cause rotation thereof. The degree of whirl given to the flow by the guide vanes is variable and is dependent on the degree of opening of the guide vanes and hence on the volume of water to be admitted. Such whirl may cooperate properly with some types of axial flow turbine runners regardless of the degree of whirl present in the water. However when a turbine of the movable vane propeller type is used, adjustment of the runner vanes introduces a factor which may render the degree of whirl imparted to the water undesirable due to variation of the angle of tilt of the vanes. It is therefore no longer sufficient to consider merely the guide vane opening but the tilt of the propeller vanes must also be considered to secure proper operation of such turbine. It has been found that, in structures of the character described, certain combinations of guide vane openings and tilt of the runner vanes do not permit satisfactory operation of the turbine. Such combinations have been found to produce noises and vibrations which are not only objectionable but are decidedly dangerous.

It is therefore one of the objects of the present invention to provide a hydraulic turbine structure with means for more efficiently conducting a whirling mass of water to a hydraulic runner of the axial flow type.

Another object of the invention is to provide a hydraulic turbine structure in which means are arranged for controlling the degree of whirling of water delivered to a hydraulic runner of the axial flow type regardless of the degree of opening of the guide vane.

Another object of the invention is to provide a hydraulic turbine structure in which means are arranged for changing the action of the whirling mass of water from the action of a free and unrestrained whirl or vortex prior to delivery thereto to a hydraulic runner of the movable vane propeller type.

Objects and advantages other than those above set forth will be apparent from the following description when read in connection with the accompanying drawings in which.

Figure 1:
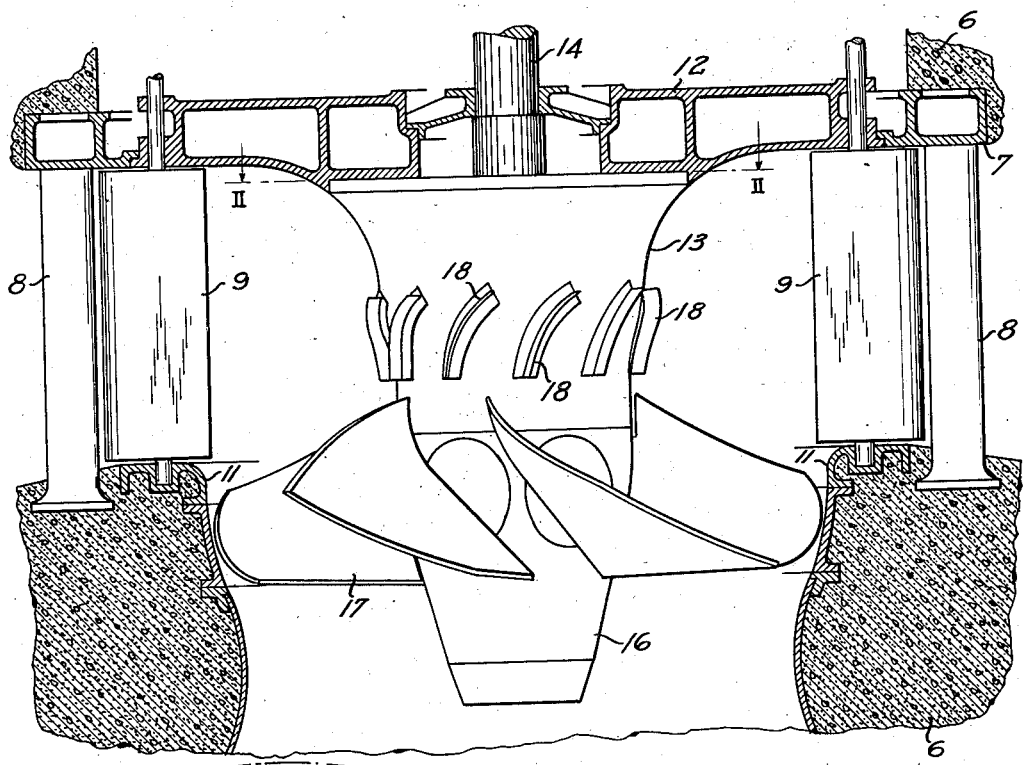
Fig. 1 is a partial elevational view, partially in section, of a hydraulic turbine illustrating the provision of and application thereto of means for controlling the vortex produced by the guide vane ahead of the runner vane of a hydraulic turbine of the movable vane propeller type.
Figure 2:
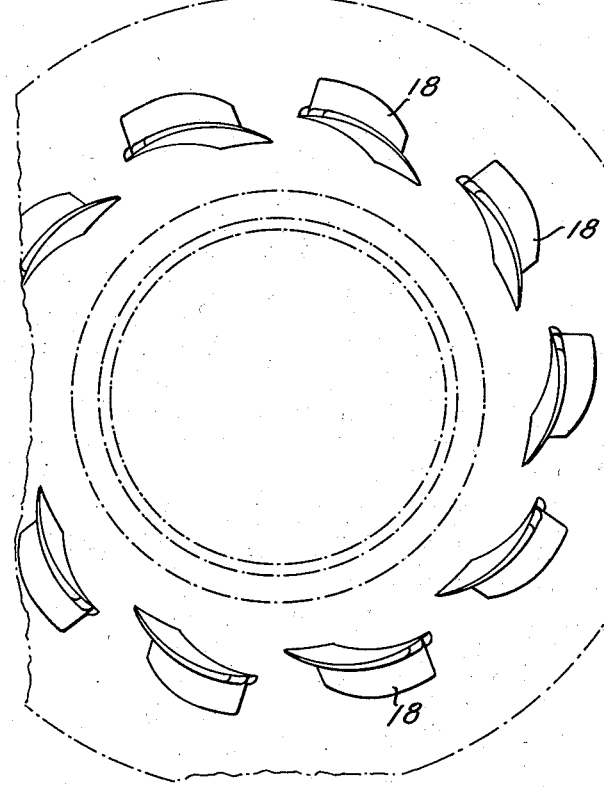
Fig. 2 is a horizontal section taken on the plane II—II of Fig. 1 and looking from the top to illustrate, more clearly, the curvature and positioning of the vortex control means.
Figure 3:
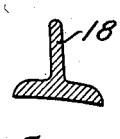
Fig. 3 is a cross sectional view taken through one of the vanes for controlling the vortex and illustrates one construction of such vane.

Referring more particularly to the drawings by characters of reference, reference numeral 6 designates the foundation of a hydraulic installation in which are set the portions 7 of the guide case which are spaced and supported from the lower portion of the foundation by stay vanes or struts 8 which are, of course, immovable. A plurality of movable vanes 9 are pivotally mounted in vertical relation, in the discharge ring 11 and the cover plate 12 to form a flow volume controlling gate and to vary the direction of flow when in any position other than the fully opened position. The cover plate 12 supports a cover plate extension 13 which is substantially conical in configuration and surrounds a shaft 14 which extends therethrough and which has mounted thereon a hub 16 in which are mounted vanes 17 which are movable or tiltable as is well known in the art.

On the cover plate extension 13 are mounted a plurality of vanes 18 which are curved in the direction of the desired flow of the water. The vanes 18 are disclosed as being formed of T-shaped members and as being secured to the cover plate extension 13. It will however be understood that the vanes may be formed in other ways and may be mounted on portions of the structure other than the cover plate extension 13.

Figure 4:
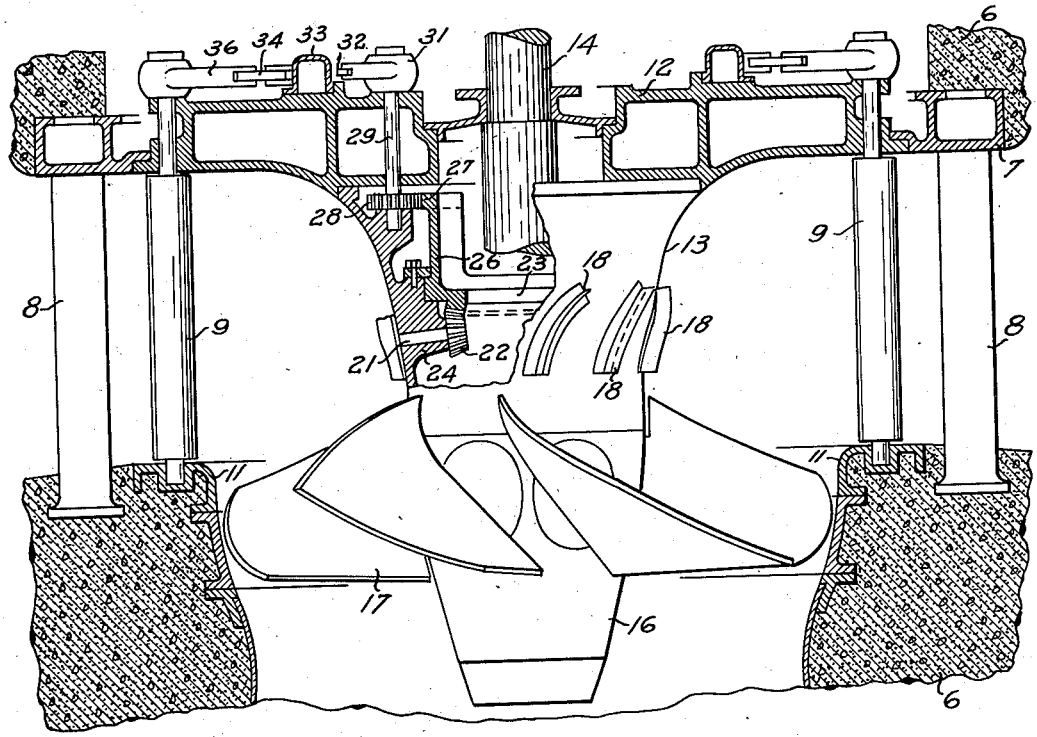
Fig. 4 is a view similar to that shown in Fig. 1, except that the vortex vanes are illustrated as being movably mounted in the cover plate extension, the cover plate extension being shown as partially broken away to disclose one method by which the vortex vanes may be operated.
Figure 5:
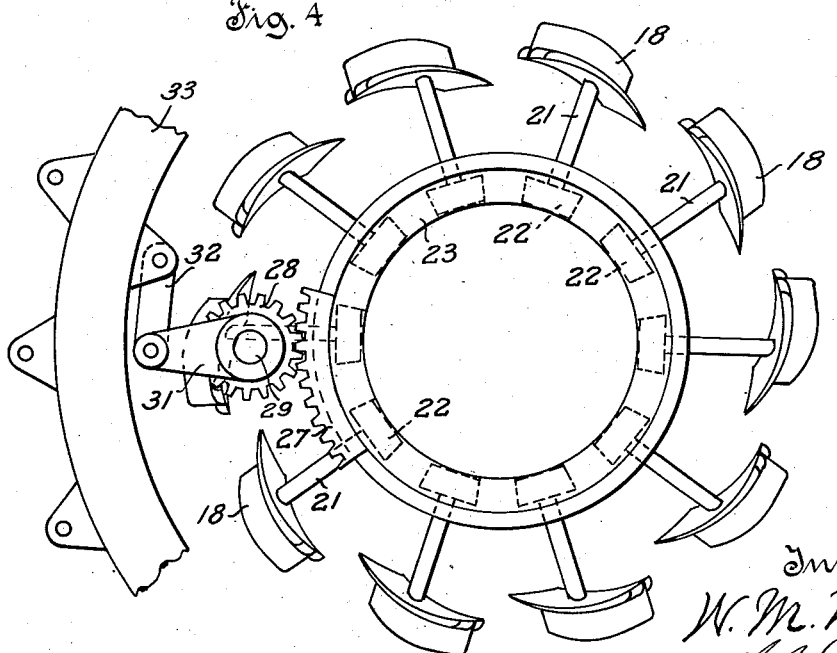
Fig. 5 is a skeleton view illustrating a portion of the operating mechanism for the vortex vanes.

Figs. 4 and 5 illustrate a construction in which the vortex vanes 18 are movably mounted in the cover plate extension 13 and are coordinately operated with operation of the guide vanes 9. A spindle 21 is secured to each of the vortex vanes 18 and extends through a thickened portion of the cover plate extension 13 serving as a bearing therefor. A gear 22 is mounted on the inner end of each of the spindles 21 and meshes with a toothed ring or rack 23 which is slidably mounted on a shoulder 24 formed about the inner surface of the cover plate extension 13. An arm 26 extends upwardly from the rack 23 and has formed thereon, on the upper end thereof, a rack 27 which may be a complete ring but is preferably only a segment of such ring. The rack 27 engages with a gear 28 mounted on a spindle 29 which is mounted in the cover plate 12 and the cover plate extension 13. The spindle extends above the cover plate 12 to provide space for the mounting thereon of a lever 31 to which is attached a link 32 which is, in turn, attached to the shifting ring 33 by which the guide vanes are controlled through a link 34 and a lever 36. Such ring is operated by operating mechanism well known in the art and therefore not illustrated or described herein.

The interaction of the several portions of the structure is believed to be explainable as follows. When water from the flume or intake casing passes through the gate and guide vanes 9, the guide vanes being in any position other than the fully opened position, the radially advancing flow is guided in such manner as to cause the water to whirl circumferentially or form a vortex in the space between the discharge edge of the guide vanes 9 and the surface of the cover plate extension 13. Due to the large area of such whirl space and particularly to the radial dimensions thereof, the vortex formed becomes so great and the velocity of the whirling water so high, that on passing through the runner and into the draft tube, a void or voids are formed, which voids increase to a maximum and then are collapsed by the pressure of the surrounding water. Water filling the voids, upon the collapse thereof, causes a water hammer condition which is repeated at such frequency as to cause the objectionable rumbling and vibration referred to above. The effect of the vanes 18 is believed to be in decreasing or otherwise controlling of the velocity of the vortex at the inner portion thereof thus preventing the formation of the voids producing the undesirable effect. The whirling water is forced to whirl and to advance axially in a solid mass thereby entering the runner vanes 17 without shock and without production of such flow conditions as would cause formation of voids.

It has been found that the vortex vanes 18 need not, and indeed should not, extend through the entire whirl space, it being sufficient that the vanes extend far enough into the whirl space to secure such pressure about the hub of the runner as may be abstracted by the runner to permit the water to discharge substantially axially along the entire edge of the runner blade. With such axial discharge of the water it is impossible for voids to form adjacent the runner. From the above description it will be seen that the vortex vanes 18 form means for controlling the action of the vortex by changing the degree of whirl adjacent such vanes from that which would otherwise be present.

As above described, the guide vanes 9 and the vortex vanes 18 cooperate or interact to control the vortectial action of the water flowing through the structure. The vortex formed is dependent on the degree of opening of the guide vanes and the position of the vortex vanes should be varied directly dependent on such degree of opening.

Due to the connection of the vortex vane operating mechanism with the shifting ring which is connected with the movable guide vanes, a greater degree of opening of the guide vanes causes a greater deviation of the vortex vanes from their initial position and vice versa. Such deviation of the vortex vanes has a greater effect on the more violent whirling of the water caused by the greater opening of the guide vanes and, consequently, the water flowing through the runner vanes is kept from forming voids regardless of the degree of opening of the guide vanes.

Although but two embodiments of the present invention have been illustrated and described, it will be apparent to those skilled in the art that various changes and modifications may be made therein without departing from the spirit of the invention or scope of the appended claims.

It is claimed and desired to secure by Letters Patent:

1. In a turbine for converting hydraulic energy into mechanical energy, a casing, a shaft extending into said casing, a turbine runner mounted on said shaft within said casing, a plurality of movable vanes forming a gate for said casing and guiding the flow of water to form a vortex, and vanes arranged between said runner and said guide vanes to control the velocity of vortex formed by the action of said guide vanes on the flow thereof.

2. In a turbine for converting hydraulic energy into mechanical energy, a casing, a shaft extending into said casing, a turbine runner mounted on said shaft within said casing, a plurality of movable vanes forming a gate for said casing and guiding the flow of water to form a vortex, and vanes arranged adjacent the edges of the vanes of said runner to control the velocity of the vortex formed by the action of said guide vanes on the flow therethrough.

3. In a turbine for converting hydraulic energy into mechanical energy, a casing, a shaft extending into said casing, a turbine runner mounted on said shaft within said casing, a plurality of movable vanes forming a gate for said casing and guiding the flow of water to form a vortex, and vanes arranged adjacent the inlet edges of the vanes of said runner at the end thereof nearest said shaft to control the velocity of the vortex formed by the action of said guide vanes on the flow therethrough.

4. In a turbine for converting hydraulic energy into mechanical energy, a casing, a shaft extending into said casing, a stationary member arranged within said casing about said shaft, a turbine runner mounted on said shaft within said casing, a plurality of movable vanes forming a gate for said casing and guiding the flow of water therethrough to form a vortex, and vanes mounted on said member to control the velocity of the vortex formed by the action of said guide vanes on the flow therethrough.

5. In a turbine for converting hydraulic energy into mechanical energy, a casing, a shaft extending into said casing, a stationary member arranged within said casing about said shaft, a turbine runner mounted on said shaft within said casing, a plurality of movable vanes forming a gate for said casing and guiding the flow of water therethrough to form a vortex, and vanes immovably mounted on said member and extending toward said guide vanes to control the velocity of the vortex formed by the action of said guide vanes on the hydraulic flow therethrough.

WILLIAM M. WHITE.